(12) United States Patent
Bourqui et al.

(10) Patent No.: US 11,114,919 B2
(45) Date of Patent: Sep. 7, 2021

(54) ACTUATOR

(71) Applicant: Johnson Electric International AG, Murten (CH)

(72) Inventors: Yvan Bourqui, Corminboeuf (CH); Daniel Soncini, Fribourg (CH); Frederic Haenni, Fribourg (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 144 days.

(21) Appl. No.: 16/528,669

(22) Filed: Aug. 1, 2019

(65) Prior Publication Data

US 2020/0044512 A1 Feb. 6, 2020

(30) Foreign Application Priority Data

Aug. 1, 2018 (CN) .......................... 201810864408.1
Aug. 1, 2018 (DE) ...................... 10 2018 118 628.2

(51) Int. Cl.
| | |
|---|---|
| *H02K 1/14* | (2006.01) |
| *H02K 5/26* | (2006.01) |
| *H02K 7/116* | (2006.01) |
| *H02K 37/16* | (2006.01) |
| *H02K 15/14* | (2006.01) |
| *H02K 15/12* | (2006.01) |

(52) U.S. Cl.
CPC .............. *H02K 7/116* (2013.01); *H02K 1/14* (2013.01); *H02K 1/146* (2013.01); *H02K 15/14* (2013.01); *H02K 5/26* (2013.01); *H02K 15/12* (2013.01); *H02K 37/16* (2013.01)

(58) Field of Classification Search
CPC ............ H02K 1/12; H02K 1/14; H02K 1/146; H02K 1/185; H02K 15/14; H02K 5/26; H02K 7/116; H02K 15/12; H02K 37/00; H02K 37/12; H02K 37/14; H02K 37/16
USPC ........................... 310/49.01, 49.51, 75 R, 89
See application file for complete search history.

(56) References Cited

U.S. PATENT DOCUMENTS

| | | | | |
|---|---|---|---|---|
| 4,679,944 A | * | 7/1987 | Sedlak | G04C 3/008 |
| | | | | 310/49.22 |
| 4,782,353 A | * | 11/1988 | Ogihara | G03B 9/08 |
| | | | | 310/112 |
| 5,521,451 A | * | 5/1996 | Oudet | H02K 21/185 |
| | | | | 310/156.26 |
| 5,880,551 A | * | 3/1999 | Prudham | H02K 21/14 |
| | | | | 310/261.1 |

(Continued)

FOREIGN PATENT DOCUMENTS

| | | | | |
|---|---|---|---|---|
| EP | 001835595 | * | 9/2007 | ............. H02K 1/141 |
| EP | 003316451 | * | 5/2018 | ............. H02K 37/14 |

*Primary Examiner* — Burton S Mullins
(74) *Attorney, Agent, or Firm* — Millman IP Inc.

(57) ABSTRACT

An actuator is provided which comprises an actuator housing having an inside surface defining a stator-receiving portion and a stator. The stator-receiving portion comprises a rotor support element, and plurality of guide projections which are spaced-apart about the rotor support element, the plurality of stator-abutment projections being integrally formed with the inside surface. The stator has a plurality of locator recesses which are engagable with the plurality of stator-abutment projections when the stator is received at the stator-receiving portion of the actuator housing to locate the stator relative to the actuator housing.

15 Claims, 5 Drawing Sheets

(56) References Cited

U.S. PATENT DOCUMENTS

| | | | | |
|---|---|---|---|---|
| 6,043,574 | A * | 3/2000 | Prudham | H02K 37/14 |
| | | | | 310/49.08 |
| 6,177,741 | B1 * | 1/2001 | Lutkenhaus | H02K 3/47 |
| | | | | 310/71 |
| 6,262,510 | B1 * | 7/2001 | Lungu | H02K 7/14 |
| | | | | 310/216.023 |
| 7,994,670 | B2 * | 8/2011 | Ji | B60Q 1/076 |
| | | | | 310/83 |
| 2018/0083506 | A1 * | 3/2018 | Bourqui | H02K 3/522 |
| 2018/0138777 | A1 * | 5/2018 | Yokoyama | H02K 3/522 |

\* cited by examiner

ACTUATOR

CROSS REFERENCE TO RELATED APPLICATIONS

This non-provisional patent application claims priority under 35 U.S.C. § 119(a) from Patent Application No. 201810864408.1 filed in The People's Republic of China on Aug. 1, 2018 and Patent Application No. 10 2018 118 628.2 filed in The Federal Republic of Germany on Aug. 1, 2018.

FIELD

The present invention relates to an actuator, particularly but not necessarily used as part of an actuator having an electric motor such as a star-shaped motor. The invention further relates to an actuator housing. Methods of assembling the actuator and forming the actuator housing are also provided.

BACKGROUND

Actuators having brushless DC motors or stepper motors are typically produced having a plastic housing, which allows for inexpensive and efficient manufacture of the motors. Many traditional actuators have DC, or tin-can type, stepper motors, however, some more modern actuators have started to utilise star-shaped brushless DC motors.

The problem with star-shaped motors is that they are relatively flat by comparison with tin-can type motors, and as a result have a width and length which is much greater than the height of the motor. The rotor is positionable within the star-shaped stator, and can then rotate at high speed. Precise positioning of the rotor is therefore very important for effective operation, and the stator should be positioned to permit smooth rotation of the rotor, thereby reducing noise.

Existing actuator housings are assembled by inserting the stator into an opening in the housing which is shaped to an outer shape of the stator. However, due to production tolerances in both the manufacture of the stator and the housing, there can be play between the stator and the stator-shaped opening. This can result in shifting of the stator in-use, de-centering the rotor with respect to the stator. This is a particular issue for multi-component stators. The alternative would be to provide a stator which is formed as a stack of single stamped parts, and the insertion of the coils onto the stator laminations is difficult to automate.

The traditional solution to this problem is to provide a spring or similar biasing element inside the housing which urges the stator into its correct position. Whilst this solves the tolerance problem, it also significantly increases the manufacturing cost, since the assembly process is more complicated, and also increases the risk of component failure.

SUMMARY

The present invention seeks to provide a simple mechanism by which a stator can be fixed into the actuator housing without causing tolerance problems during assembly.

According to a first aspect of the invention, there is provided an actuator comprising: an actuator housing having an inside surface defining a stator-receiving portion, the stator-receiving portion comprising a rotor support element, and a plurality of stator-abutment projections spaced-apart about the rotor support element, the plurality of stator-abutment projections being integrally formed with the inside surface; and a stator having a plurality of locator recesses which are abuttably engagable with the plurality of stator-abutment projections when the stator is received at the stator-receiving portion of the actuator housing to locate the stator relative to the actuator housing.

The provision of a stator having matched locator recesses to the stator-abutment projections in an actuator housing advantageously allows for the ready insertion of the stator into the housing, whilst also automatically aligning the stator to the protrusions, and by extent, relative to the rotor support element.

Preferably, each said stator-abutment projection may comprise a central support and a locator head extending laterally from the central support.

The structure of the stator-abutment projections is such that they are able to fit into a narrow region of a locator recess which is formed between two adjacent stator elements or portions of the stator. A T-shaped or substantially T-shaped stator-abutment projection may therefore advantageously fulfil this requirement.

Preferably, each of the locator heads may be oriented towards the rotor support element.

The orientation of the locator heads towards the rotor support element allows the locator heads to contact with the rotor-proximate inner surface of the locator recesses, the locator heads thereby providing a positive retaining force against the in-use stator.

Optionally, a rotor-facing surface of each locator head may contact a rotor-proximate inner surface of the locator recess when the stator is received at the stator-receiving portion.

Direct contact of the locator head against the locator recess creates a physical retention force from several directions at once, maintaining the alignment to the rotor.

Preferably, each locator head may have an arcuate or substantially arcuate or trapezoidal profile.

A substantially arcuate or trapezoidal profile of the locator head may provide a natural buttressing shape which assists with the retention of the stator in position relative to the rotor support element of the actuator housing.

Optionally, each locator recess of the stator may be formed by a pair of lateral projections extending from the stator.

The provision of physical lateral projections which are formed on the sides of stator portions of the stator provides a simple mechanism by which the useful locator recesses of the present invention can be formed, ensuring that the stator is alignable to the stator-abutment projections of the actuator housing.

The plurality of stator-abutment projections may be equiangularly spaced around the rotor support element.

To provide a uniform retaining force on the stator, it is beneficial that the guiding projections are uniformly spaced apart around the rotor support element.

Preferably, the stator may be a star-shaped stator.

The non-standard shape of a star-shaped motor, having a plurality of radially extending arms from a central rotor receiving portion, conveniently provides a variety of positions where locator recesses could be located on the stator.

In one embodiment, the stator may comprise a plurality of stator elements and a coil body with which the plurality of stator elements is engagable.

A multi-component stator is traditionally more liable to problems with tolerance, and therefore alignment with a rotor is more difficult. From an assembly perspective, a multi-component stator is preferable, and the present invention serves to limit the effect of the tolerance on the effectiveness of the actuator.

Preferably, each stator element may include a central locator arm insertable into the coil body and a pair of outer arms engagable about the coil body, each of the outer arms including a stop for at least in part forming a said locator recess.

The lateral projections of the stator elements act as useful locators for the stator into the actuator housing, not only forming locator recesses engagable with the stator-abutment projections, but also potentially acting to couple with the secondary stator-abutment elements where present.

Optionally, each locator recess may be formed at an interface between adjacent stator elements.

If the locator recess is formed between projecting portions of adjacent stator elements, the creation of the locator recesses is much more straightforward, since a dedicated locator recess does not need to be formed in any one stator element or piece.

A number of the stator elements may be equal to a number of the stator-abutment projections.

Matching the number of projections to the number of stator elements ensures that a uniformity of retention is provided for each stator element, thereby making an alignment to the rotor much more effective.

Preferably, the stator-receiving portion may further comprise a plurality of secondary stator-abutment elements for aligning the stator. Said secondary stator-abutment elements may be provided as upstanding stator arm support walls.

Secondary guide elements may improve the ease which the stator can be located in the stator-receiving area, particularly by assisting with the alignment of the arms of a star-shaped motor.

Optionally, the stator-abutment projections may in use abut against an outer surface of the stator.

By abutment against an outer surface of the stator, the stator-abutment projections are able to secure the position of the stator with an effective retention or wedging force, preventing lateral dislodging of the stator in use.

According to a second aspect of the invention, there is provided an actuator housing comprising an inside wall defining a stator-receiving portion, the stator-receiving portion comprising a rotor support element, and plurality of stator-abutment projections spaced-apart about the rotor support element, the plurality of stator-abutment projections being integrally formed with the inside wall.

An actuator housing which has integrally formed stator-abutment projections suitable for engaging with a stator enables the stator to be inserted easily without causing difficulties with alignment relative to an anticipated rotor position, as defined by the rotor support element.

Preferably, each said stator-abutment projection may comprise a central support and a locator head extending laterally from the central support.

Each of the locator heads may be oriented towards the rotor support element.

Optionally, each locator head may have an arcuate or substantially arcuate profile.

Each of the stator-abutment projections may be equiangularly spaced around the rotor support element.

Preferably, the stator-receiving portion may further comprise a plurality of secondary guide elements for aligning the stator.

The secondary guide elements may be provided as upstanding stator-arm support walls.

According to a third aspect of the invention, there is provided a method of forming an actuator housing in accordance with the second aspect of the invention, the method comprising the step of molding the actuator housing such that the rotor support element and plurality of stator-abutment projections are integrally formed together.

By forming the stator-abutment projections and rotor support element of the actuator in a single molding step, the relative positioning of these components is fixed. This compensates for tolerance in the manufacture of the stator, which is a greater issue for multi-component stators.

BRIEF DESCRIPTION OF THE DRAWINGS

The invention will now be more particularly described, by way of example only, with reference to the accompanying drawings, in which.

DETAILED DESCRIPTION

Figure 1:
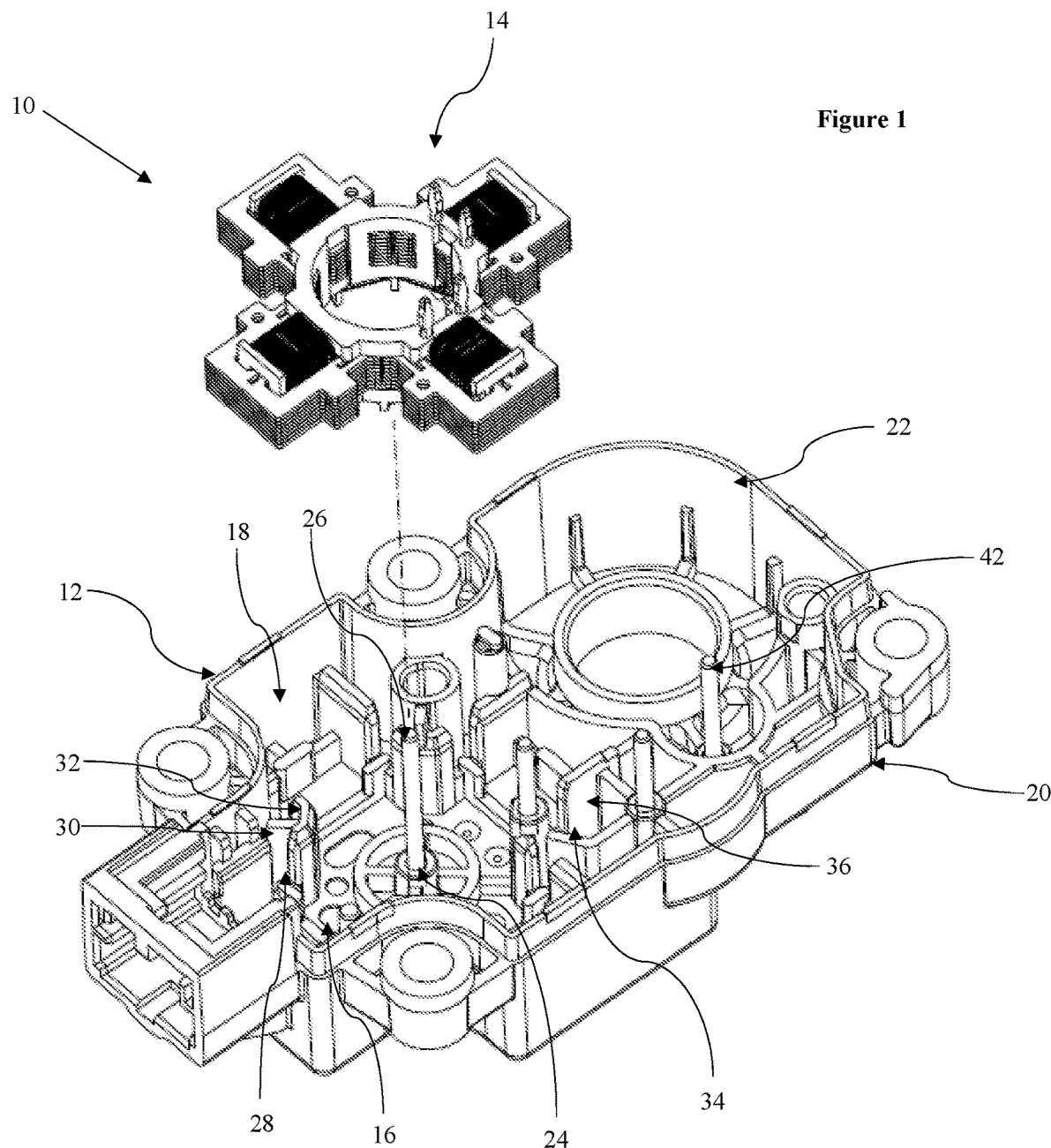
FIG. 1 shows an exploded perspective representation of one embodiment of an actuator in accordance with the first aspect of the invention.

FIG. 1 shows an actuator, indicated globally at 10, which is suitable for use as with stepper motor or similar, preferably star-shaped, brushless DC motor. The actuator 10 comprises an actuator housing 12 and a stator 14 which is insertable into the actuator housing 12 at a stator-receiving portion 16 thereof.

The actuator 10 has been designed specifically for star-shaped motors, and thus the stator 14 is illustrated as being star-shaped. It may, however, be possible to implement the present invention for other motor configurations, such as a traditional brushless motor, such as a stepper motor or a BLDC motor.

Figure 2:
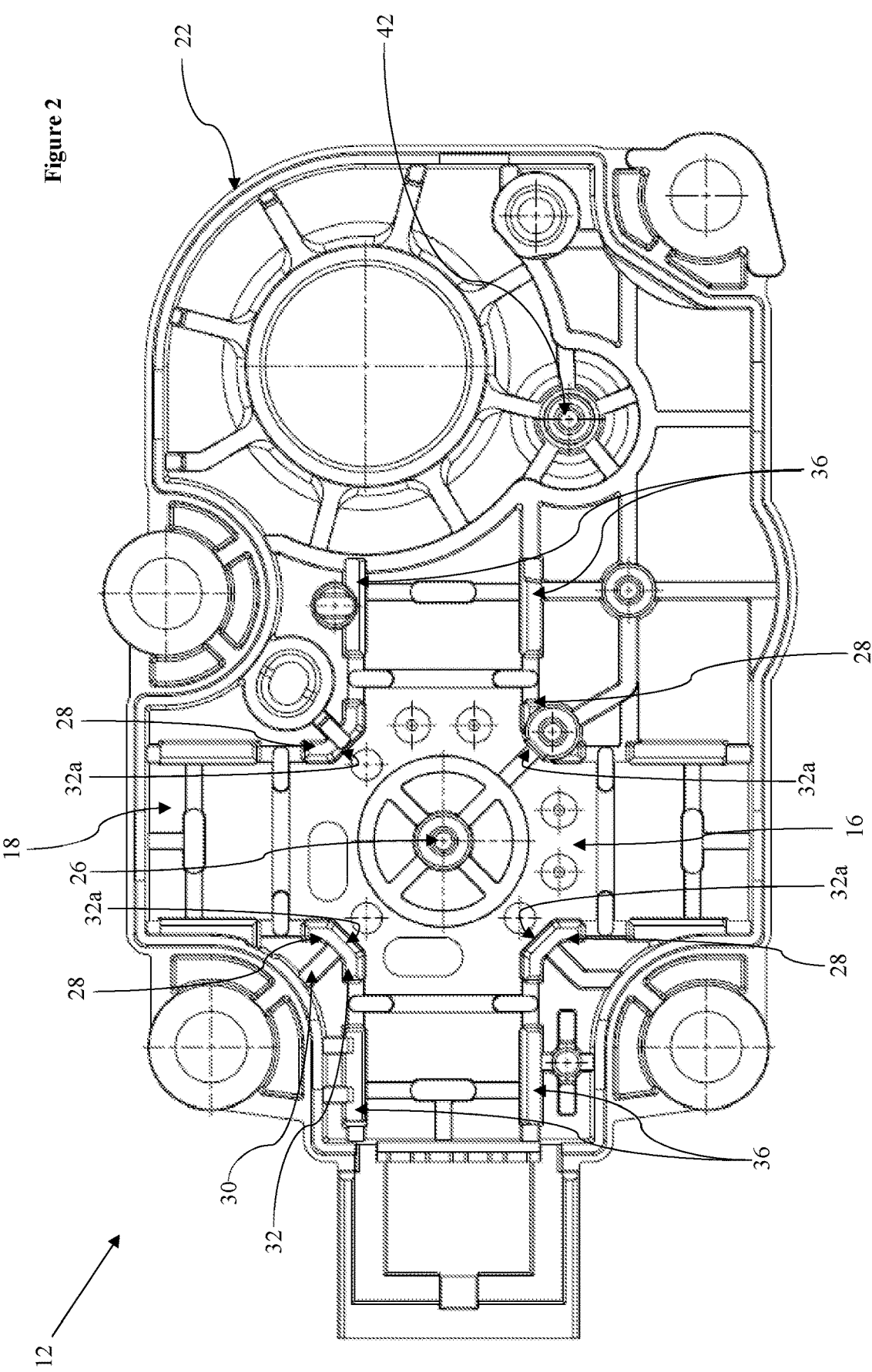
FIG. 2 shows a plan view of the actuator housing of the actuator of FIG. 1.

The actuator housing 12, shown in isolation in FIG. 2, is formed such that the necessary components of an actuator can be inserted therein. An inside surface 18 of a base 20 of the actuator housing 12 therefore may have a shape which is configured to receive said components, and has an upstanding outer wall 22 therearound which defines the extent of the actuator housing 12.

The stator-receiving portion 16 includes a rotor support element 24, shown as an axle support for a rotor, here illustrated having an axle 26 in position for engaging with a hollow rotor, and defines the central position for the stator 14. The axle 26 will typically be provided as a separate element, but could be provided so as to be integrally formed with the rotor support element 24 of the housing 12, and therefore integrally formed with the housing 12. Whilst the rotor support element is shown as an axle support, it could equally be the axle itself, or indeed a bearing support and/or bearing for a rotor. The rotor support element 24 serves to locate the rotor for rotation relative to the stator 14.

The primary locating mechanism of the stator-receiving portion 16 is provided as a plurality of stator-abutment projections 28 which are upstanding from the inside surface 18 of the actuator housing 12, preferably in a direction which is parallel with the axle 26, and which are designed to abuttably engage with the stator 14 to hold it in position in the actuator housing 12. Four stator-abutment projections 28 are illustrated here, which corresponds with a four-armed star-shaped stator 14. It is preferred that the number of stator-abutment projections 28 be equal to a number of arms of the stator 14, and/or that the number of stator-abutment projections 28 be equal to a number of joints between the arms of the stator 14, but secure engagement may be achieved with a non-equal number, however, particularly for star-shaped motors having a large number of arms.

Each stator-abutment projection 28 preferably comprises a central support 30 and a locator head 32 extending laterally from the central support 30, so as to have a generally T-shaped profile when viewed in plan. The central support 30 is here primarily provided for structural support, and could feasibly be dispensed with, if necessary. The stator-abutment projections 28 act to buttress the stator 14 once inserted.

Each locator head 32 may have an arcuate, generally arcuate, ramped, tapering, concave, or trapezoidal profile, which is itself oriented towards the rotor support element 24. Along with a preferably ramped or chamfered upper free edge to assist stator insertion, each locator head 32 preferably has a rotor-facing surface 32a which contacts the stator 14 when the stator is received at the stator-receiving portion 16, with externally laterally-projecting members, such as arms or wings, of the locator head 32 being configured to act as a securing means for the stator 14. It will be appreciated that the shape of the locator head 32 is likely to be determined by the shape of the stator 14 itself; however, the shape of the present stator-abutment projections 28 may be useful in buttressing a largely circular central portion of the stator 14 which would surround a corresponding rotor.

Figure 3:
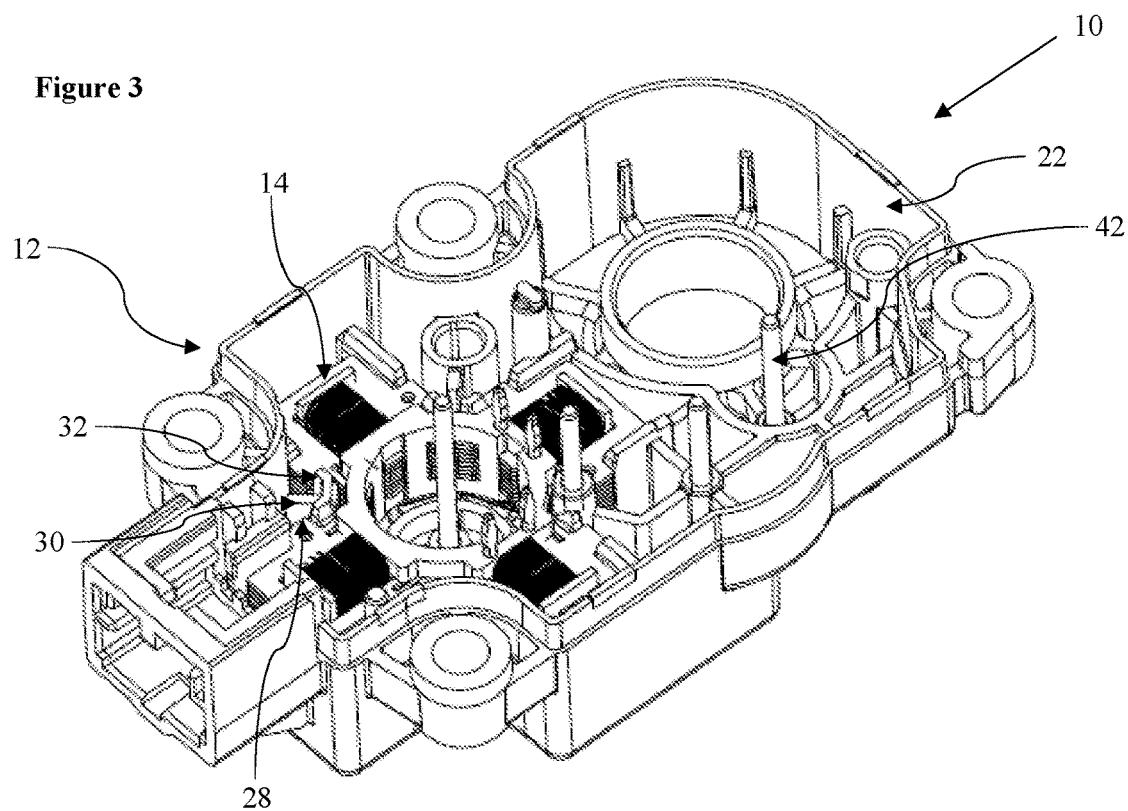
FIG. 3 shows the actuator of FIG. 1 with the stator inserted into the stator-receiving portion of the actuator housing.
Figure 5:
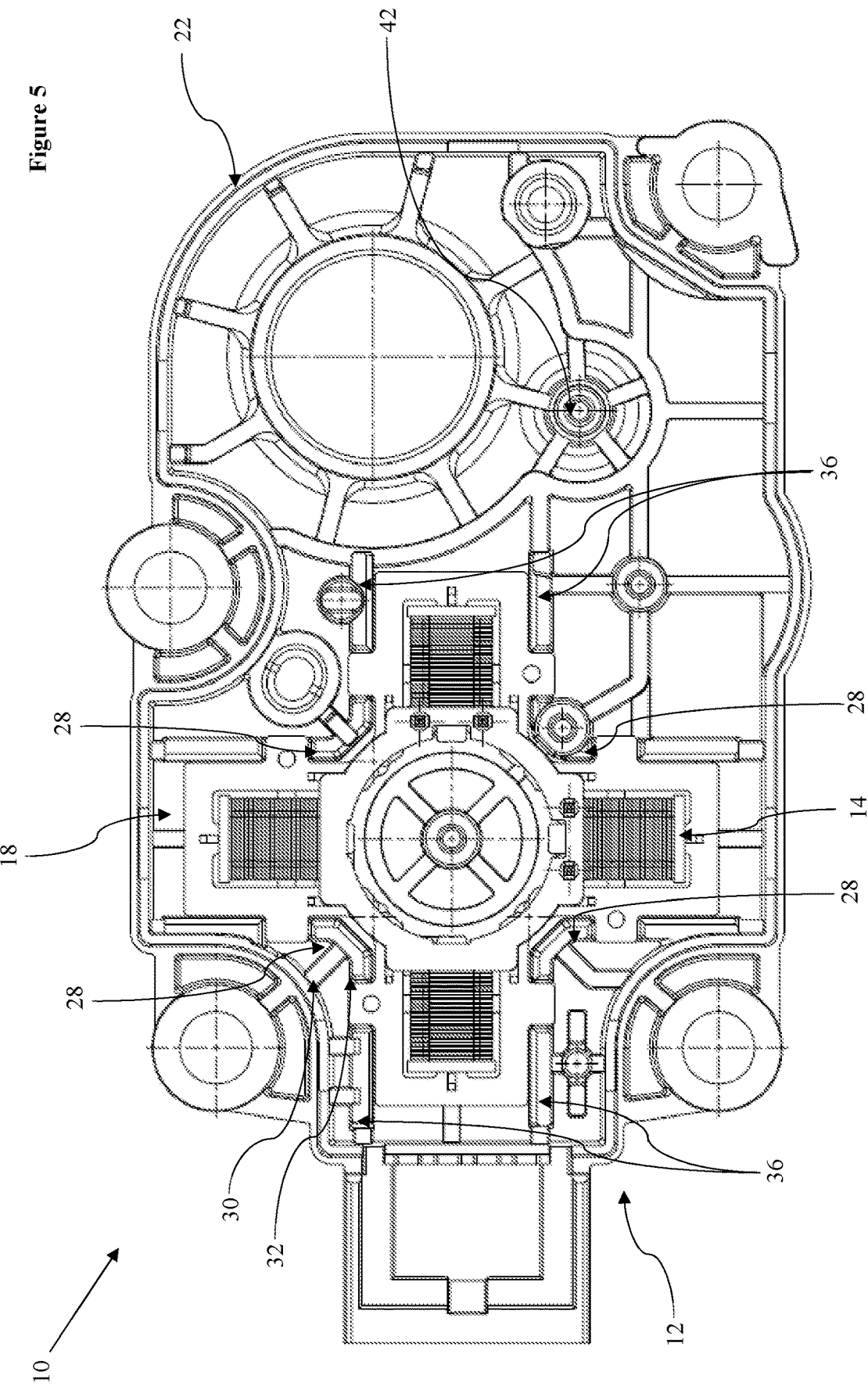
FIG. 5 shows a plan view of the actuator shown in FIG. 3.

The stator-receiving portion 16 may include secondary guide elements 34, such as channels or receivers for the stator 14, here formed as upstanding stator-arm support walls 36 which, as pairs, may define a channel for receiving and aligning the arms 38 of the stator 14, and this can be best visualised from the connected arrangement shown in FIGS. 3 and 5, in which the stator 14 has been inserted into the stator-receiving portion 16 such that the axle 26 extends through a rotor-receiving void 40 of the stator 14. Indeed, and as can be seen in FIG. 1, a space between the secondary guide elements 34 and the stator-abutment projections 28 may effectively form a saddle into which portions of the stator 14 may be seated. Other secondary guide elements 34 could be considered, such as snap-fit engagement elements, or shaped moldings.

Additional axles 42, which in this case again are preferably in the form of upstanding spindles, shafts or axles extending from the actuator housing 12, are used to support a gear train of the actuator. Exemplary additional axles 42 can be seen in FIG. 3, and help to indicate or fix a position of gears of the gear train. Again, these could potentially be integrally formed with or as part of the actuator housing 12, though these are illustrated as being separate components here.

Figure 4:
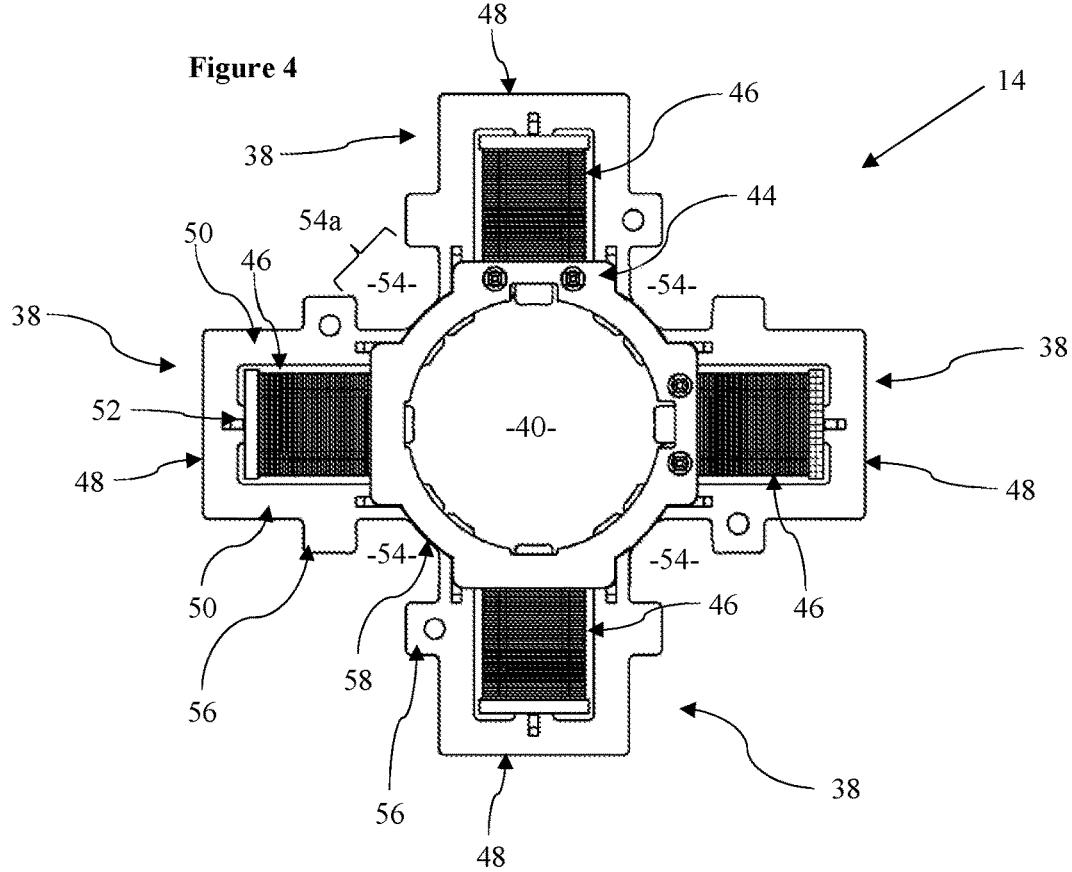
FIG. 4 shows a plan view of the stator of the actuator of FIG. 1.

The stator 14 of the present invention is shown in more detail in FIG. 4, and in situ in the actuator housing more effectively in FIG. 5. The present invention has been created with a multi-component stator in mind, since manufacturing tolerances for each component become cumulative in the completed stator 14, exacerbating the problems known in the art with centering of the in-use stator 14.

The stator 14 preferably comprises a coil body 44 having a central portion which defines the rotor-receiving void 40, and a plurality of radially extending members which form the arms 38 of the stator 14. Coil windings 46 can be wound around each of the radially extending members. The coil body 44 is preferably formed from an electrically-insulative material.

The stator 14 then also comprises a plurality of discrete stator element 48, which are here formed so as to have three conjoined arms: two outer stator arms 50, an end of each outer stator arm 50 being formed to engage around a radially-extending member of the coil body 44; and a central locator arm 52 receivable within the radially-extending member of the coil body 44.

The stator 14 as a whole is formed so as to have a plurality of locator recesses 54 which are receivable engagable with the stator-abutment projections 28 when the stator 14 is inserted into the stator-receiving portion 16 of the actuator housing 12. The shape of the locator recesses 54 is formed by the presence of lateral projections 56 projecting outwardly from each of the outer stator arms 50 of the stator elements 48, such that the locator recesses 54 are defined between and/or at the interface between two adjacent stator elements 48 once the stator 14 is assembled.

The lateral projections 56 provide a shape, preferably resulting in a constricted or throated access 54a between opposing pairs of said lateral projections 56. The locator recesses 54 with the throated access 54a are suitable for axially receiving and laterally retaining the locator heads 32 of the stator-abutment projections 28. The stator-abutment projections 28 are preferably positioned so as to captively hold the stator 14 in position with respect to the rotor support element 24. The lateral projections 56 may also abut against the secondary guide elements 34 to provide an even greater positive lateral locating force for the stator 14, holding the stator 14 more securely particularly when in use. The lateral projections 56 may therefore be seated in the saddle between the secondary guide elements 34 and the stator-abutment projections 28 in use.

The shape of a rotor-facing surface 32a of the locator heads 32 may therefore preferably be shaped to correspond with a rotor-proximate inner surface 58 of each locator recess 54. Here, this corresponds with the pseudo-arcuate profile of the locator heads 32, which could also be considered to be part trapezoidal, thereby mirroring the rotor-proximate inner surface 58.

The rotor-proximate inner surface 58 could be considered to be the surface of the locator recess 54 up to and including that which extends from a first lateral projection 56 forming a first stop on a first stator element 48, along the outer stator arm 50 towards the centre of the coil body 44, across an interface between the adjacent stator elements 48 or potentially across the coil body 44 if the stator elements 48 are slightly spaced apart from one another, up the adjacent outer stator arm 50 of a second stator element 48, and to a second lateral projection 56 forming a second stop on the second stator element 48.

Since the actuator housing 12, comprising at least the stator-abutment projections 28 and the rotor support element 24, but also preferably the secondary guide elements 34, is in this embodiment formed as an integral unit, the manufacturing tolerance in the actuator housing 12 is significantly reduced. As the positioning of these components to one another is fixed minor tolerances in the construction of the multi-component stator 14 can be accommodated, with the stator-abutment projections 28 preferably providing a retaining urging force on the stator 14 once inserted into the stator-receiving portion 16.

To form such an actuator housing 12, molding, for example via injection molding, can be conveniently considered such that the rotor support element 24 and plurality of stator-abutment projections 28 are integrally formed together.

Figure 6:
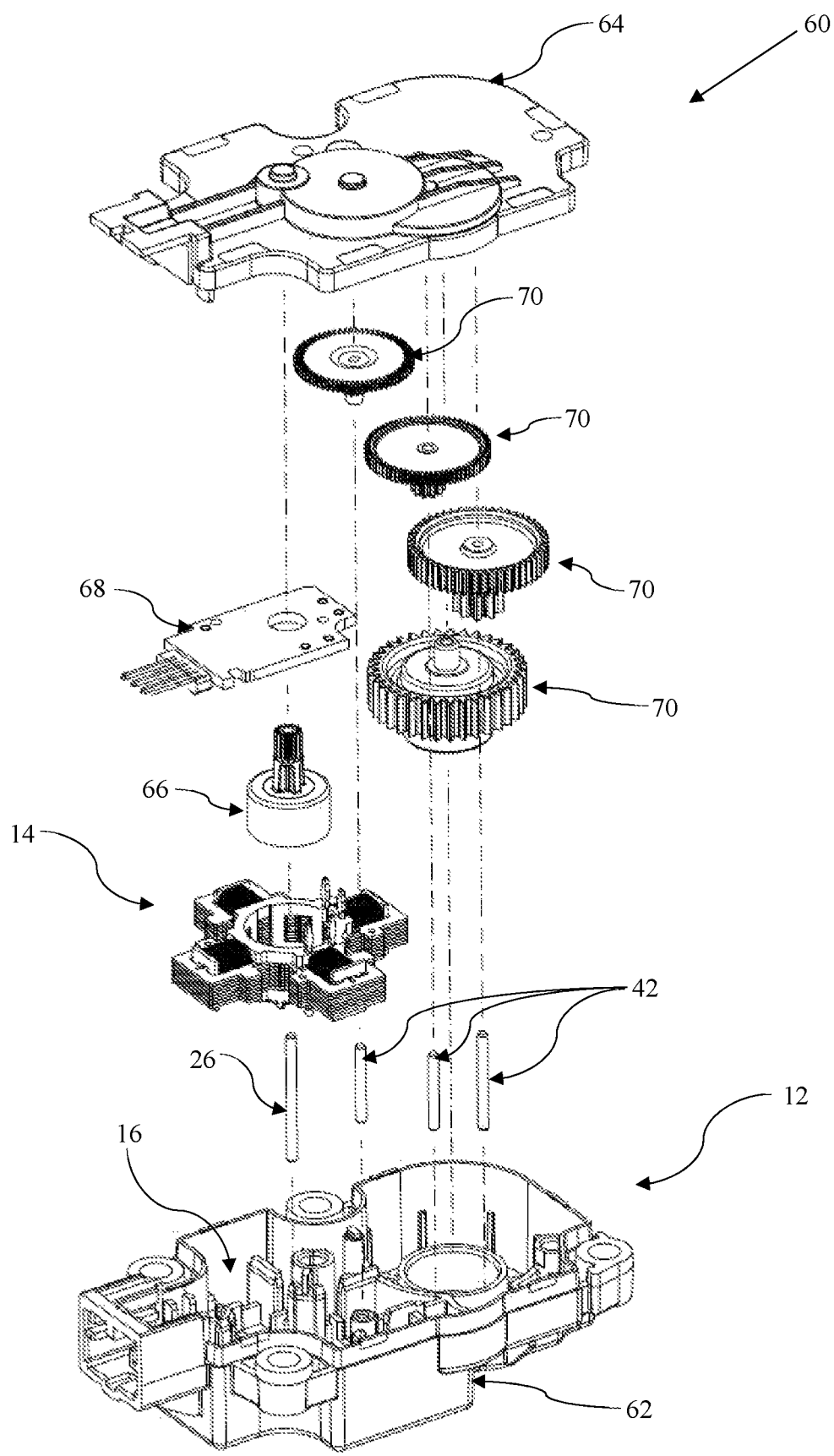
FIG. 6 shows an exploded perspective representation of the actuator of FIG. 1, inclusive of the rotor, gearing train, and second part of the actuator housing.

A complete actuator arrangement 60 is illustrated in FIG. 6. The actuator housing 12 is preferably a two-part housing, comprising the base part 62 previously described, as well as a lid 64 which is engagable with the base part 62. The axle 26 receivable in the rotor support element 24 is coaxial with a rotor 66, which is received within the rotor receiving void 40. A connector unit 68 is also provided, which includes electrical connectors which can be connected to a power supply to permit energisation of the coil windings 46.

The additional axles 42 are also shown, in-line with the various gears 70 of the gear train, which transmit drive from the rotor 66 to an output of the actuator 60. The arrangement of the gears 70 is such that a minimal height of the actuator housing 12 is required, given the large area requirement associated with a star-shaped motor.

Such an actuator can therefore be assembled by inserting the stator 14 into the stator-receiving portion 16 of the actuator housing 12. The plurality of locator recesses 54 engage with the plurality of stator-abutment projections 28 to align the stator 14 with respect to the rotor support element 24, preferably with the stator-abutment projections 28 each contacting the stator 14 to provide a uniform or relatively uniform retaining force at least laterally.

To improve an axial retaining force of the stator 14, one or more of the stator-abutment projections may include an axial retaining element, such as a detent, catch, latch, or hook. For example, providing an outwardly-projecting cantilevered hook, such as a protruding finger with a ramped outer surface, allows the stator to be slid onto the stator-abutment projections at the locator recesses 54, and the hook following flexing as the stator is pushed thereover, then returns to project over an edge of the stator body, for example, at or adjacent to the rotor-proximate inner surface 58. The stator 14 is thus more resiliently held in place when also subjected to axial forces, such as vibration or shaking when in use.

For a multi-component stator 14, assembly prior to insertion into the stator-receiving portion 16 can be achieved by providing the coil body 44 having a star-shaped configuration, and engaging the plurality of stator elements 48 with arms of the coil body 44, wherein each locator recess 54 is then formed at an interface between adjacent stator elements 48.

The present invention has been described as having a stator which has recesses into which the stator-abutment projections of the actuator housing are insertable to align and locate the stator in situ. It will be appreciated that it may be possible to provide a projection which extends from the stator and which is insertable into a corresponding recess of the actuator housing.

It is therefore possible to provide an actuator in which a stator is directly and easily locatable inside an actuator housing. The actuator housing is provided with a plurality of stator-abutment projections which are interengagable with locator recesses which can be found on the stator. Since the stator-abutment projections are integrally formed with the actuator housing, and in turn are fixed relative to an axle for a rotor of the actuator, the position of the stator will also be fixed. This is particularly advantageous for multi-component stator configurations which typically have much greater manufacturing tolerances than unitary stators. This enables a cost-effective stator to be produced, since no biasing components are required for the stator, whilst also significantly mitigating the risk of component failure.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. An actuator comprising:
   an actuator housing having an inside surface defining a stator-receiving portion, the stator-receiving portion comprising a rotor support element, and a plurality of stator-abutment projections which are spaced-apart about the rotor support element, the plurality of stator-abutment projections being integrally formed with the inside surface; and
   a stator having a plurality of locator recesses which are abuttably engageable with the plurality of stator-abutment projections when the stator is received at the stator-receiving portion of the actuator housing to locate the stator relative to the actuator housing,
   each said stator-abutment projection comprises a central support and a locator head extending laterally from the central support, and a rotor-facing surface of each the locator heads towards the rotor support element, and the rotor-facing surface of each locator head contacts a rotor-proximate inner surface of the locator recess when the stator is received at the stator-receiving portion.

2. The actuator as claimed in claim 1, wherein each locator head has an arcuate or substantially arcuate or trapezoidal profile.

3. The actuator as claimed in claim 1, wherein each locator recess of the stator is formed by a pair of lateral projections extending from the stator.

4. The actuator as claimed in claim 1, wherein the plurality of stator-abutment projections is equi-angularly spaced around the rotor support element.

5. The actuator as claimed in claim 1, wherein the stator is a star-shaped stator comprising a plurality of stator elements and a coil body with which the plurality of stator elements is engagable.

6. The actuator as claimed in claim 5, wherein each stator element includes a central locator arm insertable into the coil body and a pair of outer arms engageable about the coil body, each of the outer arms including a stop for at least in part forming a said locator recess.

7. The actuator as claimed in claim 5, wherein each locator recess is formed at an interface between adjacent stator elements.

8. The actuator as claimed in claim 5, wherein a number of the stator elements is equal to a number of the stator-abutment projections.

9. The actuator as claimed in claim 1, wherein the stator-receiving portion further comprises a plurality of secondary guide elements for aligning the stator, the secondary guide elements being provided as upstanding stator-arm support walls.

10. The actuator as claimed in claim 1, wherein the stator-abutment projections in use abut against an outer surface of the stator.

11. An actuator comprising:
an actuator housing having an inside surface defining a stator-receiving portion, the stator-receiving portion comprising a rotor support element, and a plurality of stator-abutment projections which are spaced-apart about the rotor support element, the plurality of stator-abutment projections being integrally formed with the inside surface; and
a stator having a plurality of locator recesses which are abuttably engagable with the plurality of stator-abutment projections when the stator is received at the stator-receiving portion of the actuator housing to locate the stator relative to the actuator housing, and each said stator-abutment projection comprises a central support and a locator head extending laterally from the central support, and each locator recess of the stator is formed by a pair of lateral projections extending from the stator.

12. The actuator as claimed in claim 11, wherein the plurality of stator-abutment projections is equi-angularly spaced around the rotor support element.

13. The actuator as claimed in claim 11, wherein the stator is a star-shaped stator comprising a plurality of stator elements and a coil body with which the plurality of stator elements is engagable.

14. The actuator as claimed in claim 13, wherein each stator element includes a central locator arm insertable into the coil body and a pair of outer arms engagable about the coil body, each of the outer arms including a stop for at least in part forming a said locator recess.

15. The actuator as claimed in claim 11, wherein the stator-receiving portion further comprises a plurality of secondary guide elements for aligning the stator, the secondary guide elements being provided as upstanding stator-arm support walls.

* * * * *